April 17, 1951  B. W. BRION  2,548,939
CONTROL APPARATUS
Filed May 27, 1946
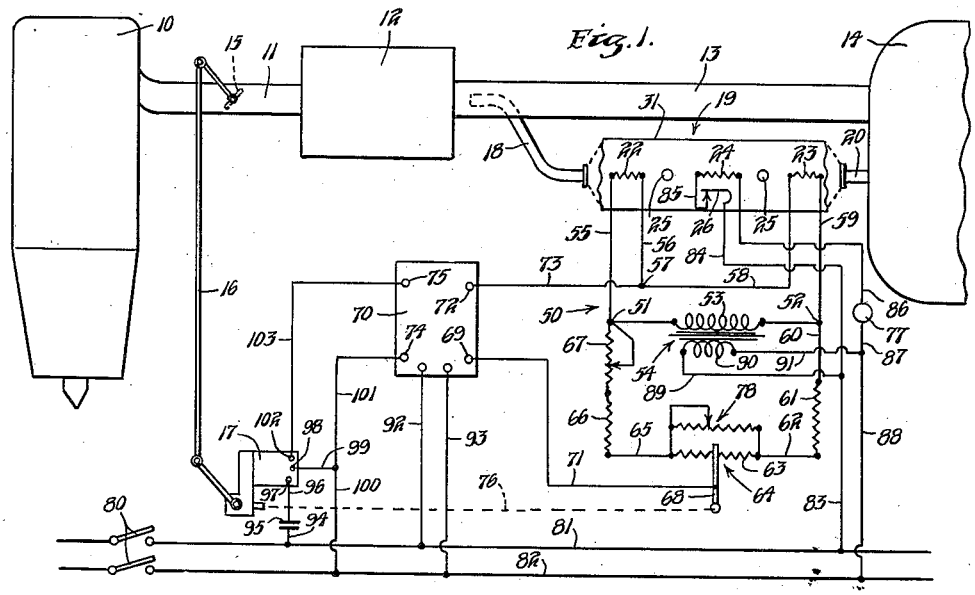
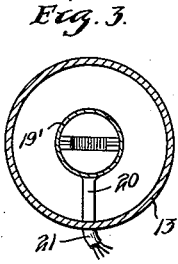
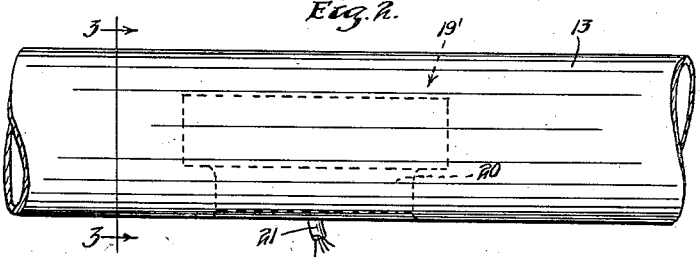
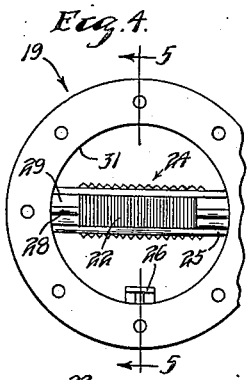
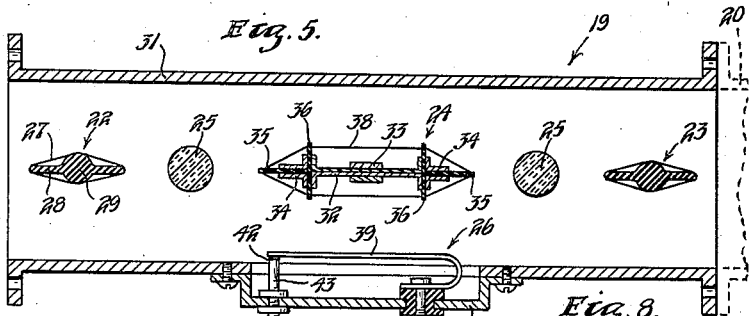
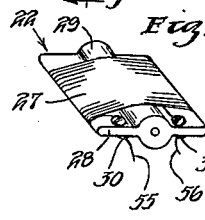
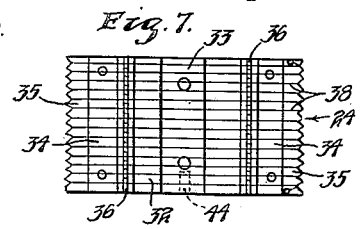
INVENTOR.
BENJAMIN W. BRION
BY
George H. Fisher
ATTORNEY Patented Apr. 17, 1951

2,548,939

UNITED STATES PATENT OFFICE 2,548,939

CONTROL APPARATUS

Benjamin W. Brion, Minneapolis, Minn., assignor to Minneapolis-Honeywell Regulator Company, Minneapolis, Minn., a corporation of Delaware Application May 27, 1946, Serial No. 672,670

6 Claims. (Cl. 98—1.5)

The present invention relates to means for sensing and controlling fluid flow, especially the mass rate of flow of air.

In many applications of flow control apparatus, such as controlling air inflow to a pressurized aircraft cabin, the requirements are so stringent that great difficulty was previously found in meeting them. For such use, it is necessary that the airflow control apparatus maintain a predetermined mass rate of airflow within rather close tolerances and yet not handicap the airplane by undue weight, excessive power requirements, and the like.

It is therefore an object of this invention to provide improved mass flow control apparatus suitable for many uses but especially adapted for aircraft.

It is a further object to provide improved mass flow control apparatus that is relatively simple and dependable and yet is capable of controlling to close limits.

In flow sensing devices of the Thomas type, it is necessary to add appreciable heat to fluid flowing through the sensing device. Because of the difficulty in providing electric current for heating, it is of advantage, and an object of this invention, to provide mass airflow sensing means having a minimum current consumption.

It is an additional object to provide mass flow sensing means of a sort that offers a minimum of resistance to fluid flow.

It is a further and related object to provide mass flow sensing means that offers sufficiently low flow resistance that it can successfully indicate full flow through a conduit by sensing only a portion of that flow.

It is an additional object to provide flow control means wherein the component parts are electrically connected, thus permitting considerable flexibility in the location of the said components and facilitating their installation.

It is of further advantage, and an object of this invention, to provide electrically operated flow control apparatus wherein the electrical apparatus is not only easily adjusted or modified, but also can be readily connected to cooperate with electric pressure control apparatus such as is used in the pressurized cabins of aircraft.

It is another object to provide temperature sensing means having low resistance to flow, a quick response to temperature change, and adequate mechanical strength and durability.

It is an additional object to provide heater means for flow sensing apparatus having low resistance to flow, mechanical strength, and a minimum thermal capacity.

It is also an object to provide flow sensing means having baffles interposed between the temperature sensing elements and the heaters so that the said sensing elements will be protected from direct radiant heat from the heater.

It is a further object to provide a flow sensing means of the Thomas type that is compact and of relatively large capacity.

It is an additional object to provide a flow sensing means of the Thomas type that is especially adapted for controlling flow.

These and other objects will be seen upon a study of the following specification and drawings wherein:

Figure 1 is a schematic showing of the present flow control apparatus applied to an aircraft.

Figure 2 is an elevation view of a section of the main conduit shown in Figure 1 showing a modified arrangement for the sensing means.

Figure 3 is a sectional view taken on line 3—3 of Figure 2.

Figure 4 shows an end view of the flow sensing means used in Figure 1.

Figure 5 is a vertical section view taken on the line 5—5 of Figure 4.

Figure 6 is a perspective view of one of the temperature responsive resistors shown in section in Figure 5.

Figure 7 is a top plan view of the heater shown in section in Figure 5.

Figure 8 is a vertical section view of a modified form of baffle usable instead of the cylindrical baffle shown in Figure 5.

Referring to Figure 1, air is supplied from the compressor of jet engine 10 through conduit 11, air conditioning apparatus 12, and conduit 13 to aircraft cabin 14. The rate of flow is controlled by damper or valve means 15 operated by linkage 16 from geared motor means 17. Valve means 15 is operable from a predetermined minimum position to a wide open or maximum position. The minimum position may be one allowing only a small flow or, if a suitable by-pass is used, the valve may be entirely closed. Air conditioning means 12 comprises any suitable apparatus for tempering the air, and may include after-cooler means, refrigerating means, and possibly auxiliary heating means. The air conditioning apparatus forms no part of the present invention, hence it has been only schematically indicated. While the supply of air is disclosed as the compressor of a jet engine, this is only illustrative. Obviously, any suitable supply can be used, such as the turbo supercharger of a conventional aircraft.

To sense the rate of airflow delivered to the cabin, a sampling tube 18 is arranged in conduit 13 and delivers air to sensing device 19, conduit 20 and the cabin 14. To successfully indicate total flow to the cabin, it is essential that the flow resistance through tube 18, sensing device 19 and tube 20 to the cabin be substantially the same as the flow resistance through conduit 13 to the said cabin. This relation is required so that variations in rate of flow through conduit 13 will be matched by like variations through the sensing device.

While the sensing device 19 is located outside of and in by-pass relation to conduit 13 in Figure 1, it is contemplated that it can also be located in the conduit 13 if desired, as in Figures 2 and 3. As shown in Figures 2 and 3, the sensing device 19' can be located in main conduit 13 and approximately concentric therewith so that a portion of the flow will be through the sensing device and the balance of the flow will be around the same. In this case too, it is essential that the pressure drop through the sensing device 19' be substantially the same as the pressure drop between the sensing device and the conduit. In Figures 2 and 3, sensing device 19' is supported in conduit 13 by a streamlined strut 20, and electrical connections from the sensing device are carried down through the strut by electric cable means 21. Excepting for the differences in mounting and the like, sensing device 19' is the same as 19 shown in Figures 1, 4 and 5.

Referring to Figure 1, sensing device 19 comprises conduit means 31, an upstream temperature responsive resistor, or thermistor, 22, a similar downstream temperature responsive resistor 23, a heater 24 and baffles 25. In addition, heater 24 is protected by a suitable temperature limiting thermostat 26. As better shown in Figures 4 and 5, the components of sensing device 19 are especially designed and constructed to give the desired response to flow without creating an appreciable obstruction to the flow.

Temperature responsive resistor 22 comprises a winding 27 of fine wire having an appreciable temperature coefficient of resistance, such as nickel wire, on a suitable insulating core. This core, of Bakelite for instance, may be considered as having a relatively flat body portion 28 and a rib-like center portion 29. The winding 27 is secured in place by lightly coating the points at which it contacts the core, that is at the edges of the body portion 28 and at the top and bottom edges of the rib-like member 29, with a light coating of a suitable insulating varnish or plastic coating material. This not only keeps the wire in its proper position on the core but also gives mechanical protection at the points where most needed. With this arrangement, it is noted that a high percentage of the winding is free of contact with the core and can thereby change in temperature very quickly and without being affected by the inherent temperature lag of the core. By making the diameter of the rib-like portion 29, or the transverse dimension of element 22, of relatively small value compared to the diameter of 31, the said thermistor 22 is able to sense the temperature of the air flowing over the same without appreciably retarding the flow. Electrical connections are made to thermistor 22 by any suitable means, such as by plugs 30 and wires 55 and 56 in Figure 6. Because thermistor 23 is substantially identical to thermistor 22, the description just recited applies equally well to this latter device.

Heater element 24 comprises a skeleton metal support means including a pair of channel members 32 riveted back to back and held by supporting members 33. Pairs of metal angles 34 arranged on either side of intervening mica means 35 are suitably secured together and then attached to the flanges of channel members 32 with mica means 36 arranged between the said channel flanges and the angle members. The outer edges of mica members 35 and 36 are suitably notched, as best shown in Figures 4 and 7, and wire 38 is wound on element 24 and in said notches. Wire 38 is of any suitable sort for heating purposes, such as Nichrome, and is designed to operate at temperatures wherein the resistance of the same remains substantially constant. Heater means 24 may be secured in the device 19 in any suitable fashion, such as by a cap screw threaded into the tapped hole 44 formed in support means 33. It is noted that heater means 24 extends substantially across the bore of conduit means 31 and is aligned with the central axis of the said means. Further, its thickness or transverse dimension is relatively small as compared to the bore and thus offers a minimum of resistance to airflow although it is arranged so that the air flowing over the same can be thoroughly and readily heated.

To protect heating element 24 from excessive temperature when no air is flowing through device 19, thermostat 26 is provided. Thermostat 26 comprises a bimetal 39 attached to a terminal 40 and carried by a closure plate 41 attached at the bottom of conduit 31. One end of the bimetal 39 carries a contact 42 which engages stationary contact 43 attached to the said member 41. When the temperature of heating element 24 rises to a point at which it is apt to be damaged by excessive temperature, bimetal 39 is biased upwardly and disengages contact 42 from 43, thereby breaking the energizing circuit for the said heating element, as shown in Figure 1, and protecting it from further temperature rise.

To limit the direct heating of temperature responsive resistors 22 and 23 due to their proximity to heater element 24, especially when no air is flowing through device 19, baffle means 25 are provided. As shown in Figure 5, these baffle means comprise cylindrical rods of lava or the like and are of just sufficient diameter that no direct radiant heat from device 24 can reach either of the sensing elements. To accomplish this, it is necessary that all straight lines that can be drawn from heater element 24 through sensing elements 22 or 23 must go through baffle means 25. In addition to preventing overheating of the sensing elements 22 and 23 when no air is flowing through the device, baffle means 25 also protect the sensing elements from unequal heating due to heating element 24 when air is flowing through the device. Because the air flowing through the device will tend to make the upstream edge of heating element 24 cooler than the downstream edge, the heat radiated from the downstream edge of the heating element will exceed that radiated from the upstream side of the element and would thereby tend to increase the temperature of 23 relative to 22. However, as baffle means 25 restrict this passage of radiant heat, this unequal heating does not take place and the apparatus is correspondingly more accurate and dependable. While the effect of radiant heat from element 24 on elements 22 and 23 can be diminished by locating the said sensing elements 22 and 23 at a greater distance from element 24, such rearrangement is of doubtful value because the greater length of the sensing means 19 would then provide more surface for heat loss through conduit 31 of the device. While the cylindrical baffle means shown in Figure 5 have proven very satisfactory in tests, streamlined baffles such as shown in section in Figure 8 also work well and may actually be better in some specific applications. The components of the present apparatus including the sensing elements, baffles and heater, are preferably disposed horizontally, as shown, although any other suitable arrangement can be used if desired.

As shown in Figure 1, thermistors 22 and 23 of sensing means 19 are connected into and form part of an electrical network circuit 50. Network circuit 50 is energized through input terminals 51 and 52 by secondary winding 53 of transformer 54. The network circuit is, starting from input terminal 51, as follows: terminal 51, wire 55, termistor 22, wire 56, output terminal 57, wire 58, thermistor 23, wire 59, input terminal 52, wire 60, fixed resistor 61, wire 62, resistor 63 of follow-up potentiometer 64, wire 65, fixed resistor 66, and variable resistor 67 to input terminal 51. Adjustable wiper 68 of follow-up potentiometer 64 comprises the other output terminal for the network. An adjustable potentiometer 78 is connected in parallel with resistor 63 for varying the potential difference across resistor 63. Wiper 68 is connected to input terminal 69 of amplifier 70 by wire 71, while output terminal 57 of the network is connected to input terminal 72 of the amplifier by wire 73.

Amplifier 70 is of any suitable sort that is capable of maintaining the same or reverse phase relation in its output as is impressed on its input terminals. Thus, if a signal of a certain phase relation is impressed on input terminals 69 and 72, the output voltage on terminals 74 and 75 of the said amplifier should be of the same phase or reverse relation. While any amplifier or relay device capable of performing the present function is suitable for this apparatus, reference is made to the amplifier disclosed in the copending application of Albert P. Upton, Serial No. 437,561, filed April 3, 1942, now Patent No. 2,423,534, as being satisfactory for this puropse. As previously noted, amplifier 70 controls the operation of motor means 17.

Motor means 17 may comprise any suitable reversible motor, but I prefer a two-phase motor of the capacitor type. Motor means 17 is provided with gearing for actuating linkage means 16 and for operating shaft 76 to which is attached wiper means 68 of follow-up potentiometer 64. Preferably motor means 17 also includes suitable stop means or limit switch means to limit the adjustment of linkage 16 and shaft 76.

To insure uniform heating of heater 24, a suitable current regulating device 77, such as a ballast resistor, is connected in the current supply for the said heater.

To better describe the present invention, the following recital of the operation is given to show the functions of the various components of this apparatus.

*Operation*

Assuming that the present apparatus is installed in an aircraft, as above noted, it may next be assumed that the apparatus is energized by closing line switch 80 thus energizing line wires 81 and 82. With the line wires energized, heater means 24 is energized by the circuit: line wire 81, wire 83, wire 84, thermostat 26, wire 85, heater means 24, wire 86, voltage regulator 77, wire 87 and wire 88 to line wire 82. In addition, transformer 54 of network 50 is energized by the circuit: line wire 81, wire 83, wire 89, primary winding 90 of transformer 54, wire 91, and wire 88 to line wire 82. Amplifier 70 is energized from the line wires 81 and 82 by wires 92 and 93 respectively.

One winding of motor means 17 is energized by the circuit: line wire 81, wire 94, capacitor 95, wire 96, motor terminal 97, terminal 98, wire 99, and wire 100 to line wire 82. This energizes the winding connected between terminals 97 and 98 of the motor. The other winding of the motor is energized by the circuit: output terminal 74 of amplifier 70, wire 101, wire 99, terminal 98 of the motor means 17, terminal 102 of the said motor means, wire 103 and output terminal 75 of the said amplifier. With motor means 17 energized as described, it will be obvious that the winding connected between terminals 98 and 102 must be energized by amplifier 70 if the motor means is to operate and the direction of rotation will depend upon whether the energizing current for the said winding is lagging or leading the current supplied the other winding.

Potentiometer 78 is adjusted to give a desired sensitivity to follow-up potentiometer 64, and thus determine the operating differential of the apparatus, and adjustable resistor 67 is adjusted to require a predetermined difference in resistance between thermistors 22 and 23 to balance the network. In normal operation, with air flowing through sensing means 19, and with heater 24 energized it is obvious that the air flowing over thermistor 23 will be at a higher temperature than that flowing over 22 due to the heat being added by element 24. If the rate of airflow is high, the heat is given up to a relatively large amount of air, therefore the temperature rise of the said air is limited. If the rate of airflow through the device is low, the heat is given up to a much smaller amount of air consequently the temperature rise is higher. Because of voltage regulator 77, the current supplied to heater 24 is kept uniform and therefore the heat output of the said heater is maintained at a uniform value. As the heat absorbed by the air, and its temperature rise, are functions of the weight of the air, it is apparent that the present apparatus automatically compensates for variations in air density and air temperature.

With the network adjusted so that there must be a predetermined difference in temperature between thermistors 22 and 23 to make the network balanced, and with no air flowing through means 19, it is obvious that the temperature of 22 and 23 will be the same and the network will be unbalanced.

Up to this point in the disclosure of the present case, the operation of the amplifier 70 in controlling motor means 17 has been discussed in terms of phase relation. While this is entirely accurate and while the balance of the network can be discussed in terms of phase relation, it is more convenient to describe the operation of the network and the other apparatus in terms of the potentials existing at the time of a half cycle. At any half cycle instant, the potentials existing throughout the system are indicative of the phase relations existing and may be properly discussed in terms of direct current relations. Because it is easier to discuss the balance conditions of an electrical network in terms of analogous direct current potentials, this description will proceed on that basis although it should be kept in mind that what is described as potential differences are actually phase differences.

Now, with the network adjusted as described and with no air flowing through 19, let it be considered that, at the half cycle in question, input terminal 51 of the network is positive relative to terminal 52. Then, with the resistance of 23 lower than it should be to establish a condition of balance in the network, output terminal 57 is closer to the potential of terminal 52 than is wiper 68, hence the output terminal 57 is negative relative to said wiper 68. Therefore, with a signal being impressed on amplifier 70 and with terminal 72 negative relative to 69, the ouput of amplifier 70 is such that terminal 75 is negative relative to terminal 74. With both windings of motor means 17 energized, by circuits previously traced, and with terminal 75 negative relative to 74, motor means 17 operates linkage means 16 and valve means 15 in a counterclockwise direction to close the said valve means 15. Likewise, in operating linkage 16 in a counterclockwise direction, wiper means 68 is adjusted to the right across resistor 63. Adjusting wiper means 68 to the right across 63 brings its potential closer to that of 52 and thus tends to balance the network. Since the resistance of 23 is lower than that required to balance the network, and with potentiometer 78 adjusted to maintain a fairly low differential for the apparatus, wiper 68 may be unable to rebalance the network until it is driven to the extreme right of resistor 63 and valve 15 is adjusted to its minimum flow position. At this point, even though a signal may still be furnished the amplifier 70, motor means 17 will be stopped due to the internal limit switches of the motor means.

If engine 10 now be started so that air can be supplied to duct 11, the minimum flow of air past valve 15 and through duct 11, air conditioning apparatus 12 and duct 13, and also through sampling tube 18, device 19 and tube 20, will take place. With a low rate of airflow through device 19, heat is delivered from heater 24 by said airflow to thermistor 23 and its temperature is considerably increased. As the temperature of 23 is increased, its resistance is likewise increased. With normal adjustment, and a minimum airflow, the temperature and resistance of 23 will rise above that contemplated and, since the resistance of 23 is now relatively high, the output terminal 57 approaches terminal 51 in potential rather than terminal 52. As wiper 68 was previously adjusted to the right side of resistor 63, only a slight increase in resistance of 23 may be required to make terminal 57 positive relative to wiper 68. As the temperature of 23 increases and 57 becomes positive relative to wiper 68, it of course follows that terminal 72 of the amplifier becomes positive relative to terminal 69 and the output of amplifier is such that terminal 75 is positive relative to terminal 74. With the winding of motor means 17 which is connected between terminals 98 and 102 energized oppositely from its previous energization, motor means 17 rotates in the opposite direction and drives link means 16 and damper means 15 in an opening direction. As damper means 15 is driven toward open position, the airflow through duct 11, apparatus 12 and duct 13, as well as that through sampling tube 18 and sensing means 19 increases. With an increased rate of airflow through device 19, the heat from heater 24 is given up to a larger mass of air hence the temperature rise of the same is lessened. This tends to decrease the temperature of 23 and thereby lower its resistance. As the resistance of 23 is lowered, output terminal 57 becomes less positive relative to wiper 68 and, when the network becomes balanced and there is no potential difference between 57 and 68, the signal to the amplifier ceases and there is no output from the amplifier. Under these conditions, motor means 17 stops and the conditions of airflow established are maintained until there is a change in temperature at resistor 23. It is thus noted that when the temperature at 23 approaches that at 22, terminal 57 tends to become negative relative to wiper 68 and thus causes operation of motor means 17 in a direction to drive damper 15 toward closed position whereas, when the temperature of 23 goes more than a predetermined amount higher than 22, output terminal 57 of network 50 tends to become positive relative to wiper 68 and thus causes motor means 17 to be operated in a direction to open the damper 15.

The present description shows the source of air as being the compressor of a jet engine. It is known that the air is relatively highly compressed in such a compressor and consequently has a fairly high temperature rise. While the added heat given the air by the compressor is generally removed by air conditioning apparatus 12, there is still some variation in air temperature which tends to vary the temperature of 22 and 23. However, as the temperature of the air circulated through device 19 varies, the resistance of both 22 and 23 will likewise vary. Because a predetermined and constant amount of heat is added by 24, the temperature difference between 22 and 23 depends on the mass rate of airflow and is unaffected by the initial temperature of the air. This amounts to automatic compensation for air temperature in the present apparatus.

Also, because the present apparatus is in an aircraft and the air furnished to the cabin is compressed to varying pressures depending on the power output of the motor, it follows that the density of the air supplied to 19 will vary. However, because the ability of air to absorb heat is dependent on its weight or mass rather than its pressure, if low density air is furnished to device 19, the predetermined amount of heat furnished by heater 24 will cause a considerable temperature rise and thereby give the same indication as insufficient air. This will result in 23 becoming hotter than intended, output terminal 57 becoming positive relative to wiper 68 and damper means 15 being adjusted in an opening direction, as previously noted. At the air density is increased, its unit mass, and therefore its ability to absorb heat, is increased and the temperature rise effective at 23 is lessened. This will cause output terminal 57 to become negative relative to wiper 68 and motor means 17 to drive damper means 15 in a closing direction, as before noted. It is therefore obvious that the present apparatus responds to flow in terms of mass rather than volume.

Because the thermal lag of sensing units 22 and 23 has been kept low by supporting the resistance windings only at spaced points and, as the heat capacity or thermal lag of heater 24 has also been kept at a minimum, the present apparatus responds quickly to changes in flow. It has been found that this response is fast enough to dampen out surges in flow common to certain types of compressors employed for the engines in question.

While the present apparatus has been rather specifically described, this has been for illustration only. There are many feasible equivalents and substitutions possible, as will be obvious to those skilled in the art. It is therefore intended that the scope of this invention be measured only by the appended claims.

I claim as my invention:

1. In an aircraft having a pressurized cabin, conduit means for delivering air to said cabin, means for controlling flow through said conduit, means for operating said flow controlling means; means for controlling said operating means comprising, in combination, means responsive to the mass rate of flow through said conduit, said responsive means including first thermistor means, a heater means and second thermistor means, an electrical network including a follow-up potentiometer and said first and second thermistors, said potentiometer being adjusted by said operating means, means for energizing said network, and amplifier means controlled by said network, said amplifier means being connected in controlling relation to said operating means.

2. In an aircraft having a cabin supplied with air through a conduit, means for controlling flow through said conduit comprising, in combination, valve means, reversible motor means for operating said valve means, means for sensing mass rate of air flow, means for directing a portion of the flow in said conduit through said sensing means, an amplifier means, an electrical network circuit means for connecting said sensing means in controlling relation to said amplifier means, said amplifier means controlling the operation of the said motor means, and manually adjustable means for adjusting said network circuit means.

3. In apparatus for controlling the mass rate of flow of a medium, conduit means for said medium, means for controlling flow through said conduit means, motor means for operating said controlling means, means for separating a portion of said flow from the rest of the flow, means for heating said separated portion, means for responding to the temperature of medium the flow of which is being controlled, means for responding to the temperature of said separated portion after said heating, means for connecting both of said temperature responsive means in controlling relation to said motor means, and temperature responsive means adjacent said heating means connected in controlling relation to said heating means.

4. In a flow sensing device, conduit means, heater means extending across the diameter of said conduit means, said heater means having a transverse thickness appreciably less than the diameter of said conduit means, a pair of elongated temperature responsive resistors spaced along the central axis of said conduit from said heater means, one of the resistors being upstream and the other downstream from said heater means said resistors being parallel to said heater means, and shielding means between each of said resistors and said heater means, each of said shielding means having a smooth surface and being impervious to the passage of direct radiation and having a length and thickness such that it extends just beyond the greatest spaced straight lines that can be drawn between the heater means and the respective shielded resistor.

5. In a flow sensing device, conduit means, heater means extending across the bore of said conduit means, said heater means being elongated in the direction of the axis of said conduit means and the thickness of said heater means being substantially less than the diameter of said conduit, two temperature responsive resistors located within said conduit means and spaced from said heater means, one of said resistors being upstream and the other downstream from said heater means, each of said resistors including a core member having a relatively flat body portion and a rib-like portion, the transverse dimension of said rib-like portion also being relatively small, each of said resistors being arranged substantially parallel with said heater means, and a pair of smooth surfaced heat shielding means also substantially parallel with said heater means for protecting said temperature responsive resistor from direct radiant heat from said heater means without appreciably increasing air resistance through said conduit means, each of said shielding means extending across the full diameter of said conduit and having a thickness slightly exceeding the average of the maximum thickness of the heater means and the maximum thickness of the respective shielded resistor.

6. In a flow sensing device, a conduit means, heater means extending across the inside of said conduit means, the transverse dimension of the heater means being considerably less than the diameter of the conduit means, a pair of temperature responsive resistors arranged in said conduit means substantially parallel to said heater, one of said temperature responsive resistors being spaced downstream from said heater means and the other temperature responsive resistor being spaced upstream from said heater means, each of said temperature responsive resistors having a transverse dimension less than the like dimension of said heater means, and heat shielding baffle means arranged between each of said temperature responsive resistors and said heater means in substantial parallelism therewith, said baffle means being impervious to direct passage of radiant heat, each of said baffle means extending across the conduit means and having a transverse dimension great enough to extend slightly beyond the greatest spaced straight lines that can be drawn between said heater means and the respective shielded resistor.

BENJAMIN W. BRION.

REFERENCES CITED

The following references are of record in the file of this patent:

UNITED STATES PATENTS

| Number | Name | Date |
| --- | --- | --- |
| 1,193,488 | Thomas | Aug. 1, 1916 |
| 1,257,468 | Wilson | Feb. 26, 1918 |
| 1,673,041 | Connet et al. | June 12, 1928 |
| 1,713,833 | Kochendorfer | May 21, 1929 |
| 1,769,358 | Pinkerton et al. | July 1, 1930 |
| 1,832,809 | Hudson | Nov. 17, 1931 |
| 2,067,645 | Pinkerton | Jan. 12, 1937 |
| 2,284,984 | Nixon et al. | June 2, 1942 |
| 2,353,201 | Talbot | July 11, 1944 |
| 2,385,664 | Warner | Sept. 25, 1945 |
| 2,390,487 | Lawrence et al. | Dec. 4, 1945 |

FOREIGN PATENTS

| Number | Country | Date |
| --- | --- | --- |
| 869,118 | France | Oct. 29, 1941 |